(12) United States Patent
Zinevich et al.

(10) Patent No.: US 12,143,262 B2
(45) Date of Patent: Nov. 12, 2024

(54) TIME STAMP METHOD OF LOCATION LEAKAGE IN HIGH SPLIT HFC NETWORK

(71) Applicant: Arcom Digital, LLC, Syracuse, NY (US)

(72) Inventors: Victor Zinevich, Voronezh (RU); Greg Tresness, Manlius, NY (US)

(73) Assignee: Arcom Digital, LLC, Syracuse, NY (US)

( * ) Notice: Subject to any disclaimer, the term of this patent is extended or adjusted under 35 U.S.C. 154(b) by 0 days.

(21) Appl. No.: 17/703,059

(22) Filed: Mar. 24, 2022

(65) Prior Publication Data

US 2022/0311660 A1    Sep. 29, 2022

Related U.S. Application Data

(60) Provisional application No. 63/175,823, filed on Apr. 16, 2021, provisional application No. 63/166,589, filed on Mar. 26, 2021.

(51) Int. Cl.
| | |
|---|---|
| *H04L 41/0677* | (2022.01) |
| *H04B 7/185* | (2006.01) |
| *H04L 1/00* | (2006.01) |
| *H04L 12/28* | (2006.01) |
| *H04L 43/50* | (2022.01) |

(52) U.S. Cl.
CPC ..... *H04L 41/0677* (2013.01); *H04B 7/18506* (2013.01); *H04L 1/0071* (2013.01); *H04L 12/2801* (2013.01); *H04L 43/50* (2013.01)

(58) Field of Classification Search
CPC ............... H04L 41/0677; H04L 1/0071; H04L 12/2801; H04L 43/50; H04B 7/18506
See application file for complete search history.

(56) References Cited

U.S. PATENT DOCUMENTS

| | | | |
|---|---|---|---|
| 6,785,292 B1 * | 8/2004 | Vogel | H04L 9/40 725/111 |
| 11,356,178 B2 | 6/2022 | Zinevich | |
| 2003/0031198 A1 * | 2/2003 | Currivan | H04L 1/0065 370/465 |
| 2003/0067883 A1 * | 4/2003 | Azenkot | H04N 7/17309 370/386 |

(Continued)

OTHER PUBLICATIONS

ISA/EPO International Search Report and Written Opinion for corresponding International Application No. PCT/US2022/021942 dated Jun. 28, 2022 (12 pages).

*Primary Examiner* — Chirag G Shah
(74) *Attorney, Agent, or Firm* — Harris Beach PLLC

(57) ABSTRACT

A time stamp method of location leakage in an aeronautical band of a high split HFC includes: scheduling at a cable modem termination system (CMTS), a generation of a plurality of OUDP bursts by at least one cable modem (CM) within a node in a fixed sequence; measuring a field leakage detector time stamp of a plurality of detected OUDP bursts relative to a half second GPS synch pulse, and sending a report to a leakage data server with a set of current GPS coordinates of a leakage detector, a time stamp, a detected leak level, and a measured OUDP time stamp; and calculating at the leakage data server, a CM ID based on the measured OUDP time stamp and a duration of an OUDP burst combined with a query to the CMTS and a CM database, to define a physical address of a CM corresponding to the CM ID.

7 Claims, 11 Drawing Sheets

(56) References Cited

U.S. PATENT DOCUMENTS

| | | | |
|---|---|---|---|
| 2006/0013155 A1* | 1/2006 | Spaete | H04L 12/2805 |
| | | | 370/320 |
| 2014/0282783 A1 | 9/2014 | Totten et al. | |
| 2016/0197804 A1* | 7/2016 | Zinevich | H04L 1/206 |
| | | | 370/252 |
| 2017/0272184 A1* | 9/2017 | Zinevich | H04B 17/345 |
| 2017/0310539 A1* | 10/2017 | Jin | H04L 41/0677 |
| 2017/0310541 A1 | 10/2017 | Jin | |
| 2018/0145843 A1* | 5/2018 | Choi | H04L 12/2801 |
| 2018/0270773 A1* | 9/2018 | Lee | H04W 56/0015 |
| 2018/0294837 A1* | 10/2018 | Chapman | H04L 1/0071 |
| 2020/0092071 A1* | 3/2020 | Sun | H04W 72/541 |
| 2020/0178121 A1* | 6/2020 | Simon | H04L 7/027 |
| 2021/0226664 A1* | 7/2021 | Couch | H04L 27/2601 |
| 2022/0200715 A1 | 6/2022 | Zinevich | |

* cited by examiner

TIME STAMP METHOD OF LOCATION LEAKAGE IN HIGH SPLIT HFC NETWORK

CROSS-REFERENCE TO RELATED APPLICATIONS

This application claims priority to and the benefit of co-pending U.S. provisional patent application Ser. No. 63/175,823, TIME STAMP METHOD OF LOCATION LEAKAGE IN HIGH SPLIT HFC NETWORK, filed Apr. 16, 2021, and U.S. Provisional Application No. 63/166,589, entitled TIME STAMP METHOD OF LOCATION LEAKAGE IN HIGH SPLIT HFC NETWORK, filed Mar. 26, 2021 both of which applications are incorporated herein by reference in their entirety.

FIELD OF THE APPLICATION

The application relates to signal leakage detection, particularly to signal leakage detection in a High Split Hybrid-Fiber-Coaxial (HFC) network.

BACKGROUND

Monitoring for signal leakage is a regular practice in the majority of HFC networks throughout the world. This monitoring is performed as a quality assurance practice to maintain the integrity of the plant, and also for compliance with mandated aeronautical band monitoring from governmental authorities such as the Federal Communications Commission (FCC) in the United States.

SUMMARY

A time stamp method of location leakage in an aeronautical band of a high split HFC includes: scheduling at a cable modem termination system (CMTS), a generation of a plurality of OUDP bursts by at least one cable modem (CM) within a node in a fixed sequence, a first OUDP burst in the generation of OUDP bursts synchronous with a GPS half second sync pulse; measuring a field leakage detector time stamp of a plurality of detected OUDP bursts relative to a half second GPS synch pulse, and sending a report to a leakage data server with a set of current GPS coordinates of a leakage detector, a time stamp (e.g. a UTC time stamp), a detected leak level, and a measured OUDP time stamp; and calculating at the leakage data server, a CM ID based on the measured OUDP time stamp and a duration of an OUDP burst combined with a query to the CMTS and a CM database, to define a physical address of a CM corresponding to the CM ID.

The step of scheduling can include the generation of the plurality of OUDP bursts with a spatial interleaving where adjacent OUDP bursts in said sequence corresponds to CMs located in a node area. The step of scheduling can include generating said sequence of OUDP bursts synchronous with GPS half second sync pulses wherein a sync accuracy is selected within an integer number of OFDMA frames.

The step of calculating can include determining if a leakage comes from a drop or trunk line by comparing a level of a detected upstream OUDP leakage with a downstream leakage level detected at higher frequencies bands, and stable time stamp of a detected OUDP burst within an adjacent one second measurement session. The step of calculating can include calculating a routing to an integer value of a CM ID=X, based on an OUDP time stamp and an OUDP burst duration, and a spatial analysis of adjacent CMs in a sequence with IDs=X−1, X and X+1, and then selecting the CM ID which is located closer to a leakage detector location at about the measured OUDP time stamp.

6. A time stamp method of location leakage in an aeronautical band of a high split HFC includes: scheduling at a CMTS, generation of a plurality of OUDP bursts by a plurality of cable modems (CM) within a node, a fixed sequence from a first CM #=1 to a last CM #=M, and then from last CM #=M to first CM #=1; measuring at a leakage detector, a time difference between a plurality of time stamps of detected adjacent OUDP bursts, and sending at least one report to a leakage data server with a set of current GPS coordinates of the leakage detector, a measured time difference between the detected adjacent OUDP bursts, and a detected leak level; and calculating at the leakage data server, a CM ID sequence scheduled by the CMTS based on the measured time difference between the detected adjacent OUDP bursts and a query to a CM database to define a physical address corresponding to the CM ID.

The step of scheduling can include generating the OUDP bursts where each OUDP burst includes an even number of OFDMA frames and where a gap between sequences of the OUDP bursts is defined by one OFDMA frame.

The step of calculating can include defining the physical address based on a number of OFDMA frames within a measured time difference interval between OUDP bursts, followed by calculating a CM order in a transmission (Tx) sequence based on a number of odd or even frames within the measured time difference between the detected adjacent OUDP bursts.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
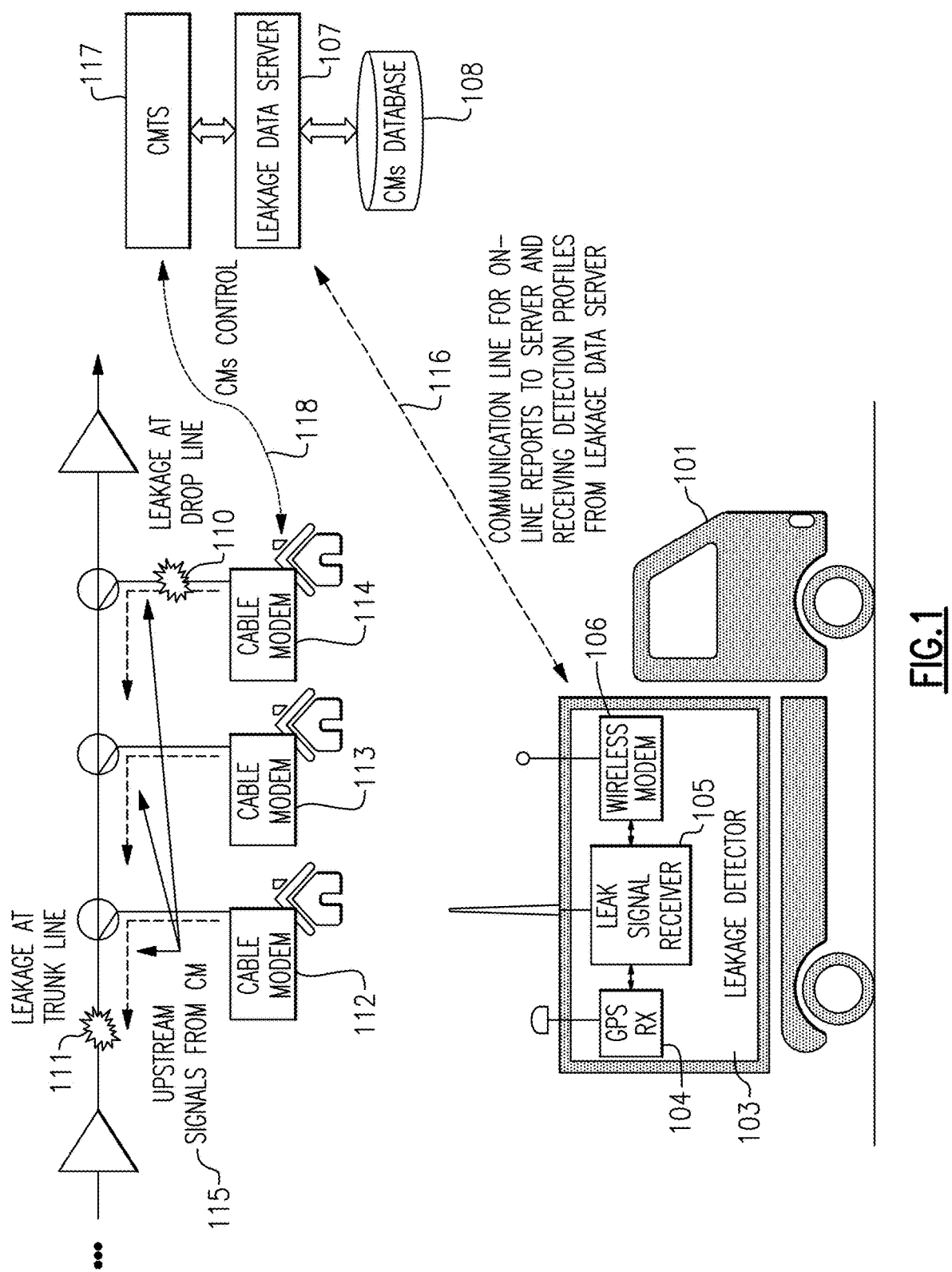
FIG. 1 is a block diagram showing an exemplary system for detection leakage in high split HFC network.

As described hereinabove, monitoring for signal leakage is a regular practice in the majority of HFC networks throughout the world. This monitoring is performed as a quality assurance practice to maintain the integrity of the plant, and also for compliance with mandated aeronautical band monitoring from governmental authorities such as the Federal Communications Commission (FCC) in the United States.

Typically, monitoring is a two-step process whereby initially vehicles drive around the network collecting data using leakage detection equipment installed in the vehicle. Data pertaining to the detected leaks such as the detected leak level, detection frequency, and GPS coordinates at the various detection points is typically transmitted to some server where a variety of techniques (differing based upon the leakage detection vendor) are employed to obtain the best estimate of the actual leak location.

As the second step, a technician is typically dispatched with a work order to fix a particular leak at its estimated location. The technician arrives at the approximate location, and exits the vehicle with hand held leakage equipment in an attempt to troubleshoot the exact source of the shielding deficiency from which the leak is egressing the HFC network. This troubleshooting process can be quite time consuming and expensive as the technician has to walk around in order to determine if the leak is originating from the drop or the hardline, and then determine where particularly the leak is located. The process requires trained and skilled technicians.

The process described above is the status quo technique used in low and mid split HFC networks where the detected signal in the aeronautical band is transmitted at forward frequencies of the network. However, new changes to system architectures in the form of high split HFC configurations are now being introduced where signals occupying the aeronautical band now overlap the return band frequencies. The signal used for leakage detection now originates at the cable modem (CM) located within the customer premises.

Several techniques have been proposed to perform this return band high split leakage detection as have been described in the technical paper Leakage in a High Split World by Chrostowski et al., presented at the 2020 SCTE Cable-Tec Expo. SCTE. For a variety of reasons, the OUDP approach described in the paper appears to be the technique that will be most widely adopted. One OUDP approach was described in co-pending U.S. patent application Ser. No. 17/088,775, MONITORING LEAKAGE IN AERONAUTICAL BAND OF HIGH SPLIT HFC, filed Nov. 4, 2020, now allowed, and also assigned to ARCOM. The '775 application is included in this description, and incorporated herein by reference in its entirety for all purposes.

With the OUDP technique, the timing and control of the OUDP burst is orchestrated by the CMTS, with only one CM bursting at any one moment within each node. Since the timing of the burst can be controlled, it is of interest to find a method such that the identity of the CM from which the detected signal is received in the field, can be exactly identified. Such an identification can greatly simplify the last step leak identification process and provide significantly improved technician efficiency. Given that tens of thousands of leaks are fixed each year by HFC operators, the time savings and efficiency can be substantial.

One method to achieve this identification is to add some additional modes to the OUDP burst timing such that only one CM in any one area is bursting during a measurement session. With this technique, as a last identification step, all of the OUDP traffic in a node would be suspended, and instead a schema whereby CM's nearby the truck would be directed to burst one by one CM, to resolve which burst is detected by the leakage receiver. And if the CM directed to burst corresponds to a time in which leakage was detected, the source would be that specific modem ID from which the address could be resolved from a database.

Alternative more efficient polling schemas could be deployed whereby say a group of 8 out of say 16 nearly CM are directed to burst, and if leakage is detected, then break that group into 4, then half again until one CM address is identified. But regardless of technique, this process is very complicated logistically, requires control over specific CM's by field personnel through the CMTS (which is complicated), is bandwidth inefficient, and would be challenging to implement in real life.

A second method to identify the detected CM is described, whereby time stamps of each CM OUDP burst from the CMTS is recorded in a database, and the time stamp of each CM OUDP burst is compared to a database of time stamps of GPS locations in the field where leakage was detected. While this approach can work, it uses a large amount of data and a large amount of post processing analysis. There are also problems with this approach near node boundary areas where it is uncertain from which node the leak is originating (the vehicle could be physically in one node while detecting a leak originating in an adjacent node).

Two embodiments of a Time stamp method are described hereinbelow, a time stamp method which uses precision timing, and a differential time stamp method in which precision timing is not necessary.

The first approach uses a combination of techniques, individually or combined, where exact time stamps are measured by the detector, based upon known burst duration, and based upon control of the sequence of CM bursting. With this novel approach, the CM ID can be identified during the initial driveout period.

The second approach uses a combination of techniques, individually or combined, where exact time stamps are measured by the detector, based on known burst duration, and based on control of multiple sequences of CM bursting in differing order. Time differences between the detected sequential burst are used to mathematically determine the exact CM ID at the detection location. Additional refinement techniques such as Spatial Interleaving are also described.

An exemplary system for detection leakage in high split HFC network according to the Application is illustrated in the schematic block diagram of FIG. 1 is now described in detail. The exemplary system of FIG. 1 includes a field leakage detector 103 installed on any suitable vehicle, such as truck 101, and leakage data server 107. Field leakage detector 103 includes leak signal receiver 105, GPS receiver 104 and wireless modem 106. Leakage data server 107 has access to database 108 with the physical addresses of the CMs and to CMTS 117, which controls CMs 112, 113 and 114. CMs 112 . . . 114 generate upstream signals 115 in frequency bandwidth from 5 MHz to 204 MHz in high split HFC network. This bandwidth overlaps with aeronautical bandwidth 108-137 MHz and that is why upstream leakage signal could produce interference in the aeronautical band at the points of shielding deficiencies. The possible locations of shielding deficiency could be in the trunk line (leakage source 111 in FIG. 1) or in the drop line (leakage source 110 in FIG. 1).

Figure 2:
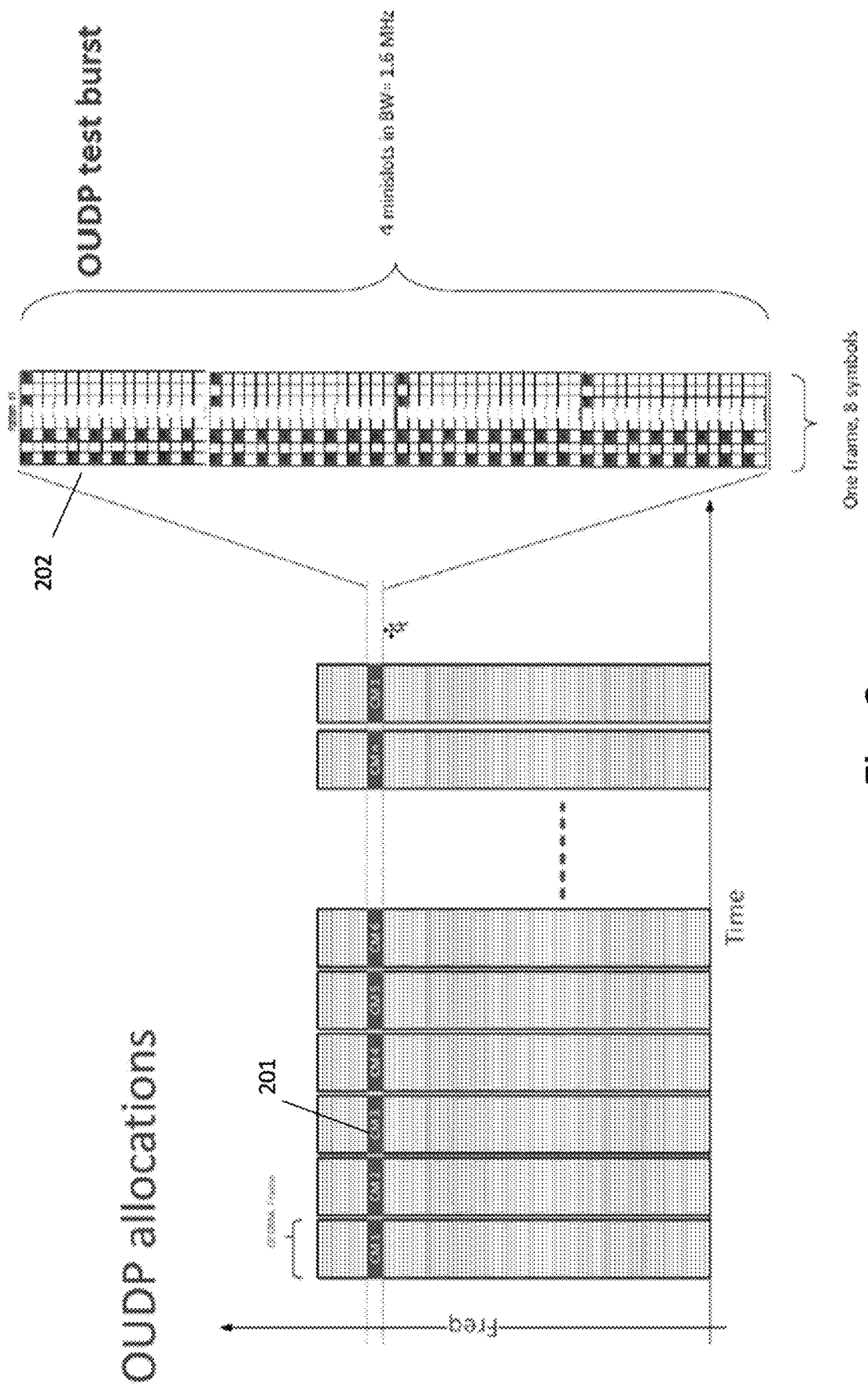
FIG. 2 is a drawing which illustrates an exemplary upstream leakage detection in an aeronautical band of a high split HFC network by using OUDP bursts from CMs.

The system of FIG. 1 works as follows: Leakage detector 103 sends reports, e.g. each second report 116 to leakage data server 107 with results of detection and the current GPS coordinates of truck 101. Leakage data server 107 analyzes the received reports, and then calculates leak locations by using different methods. In the scenario of high split HFC network for detection of leakage in the aeronautical band, CMTS 117 schedules OUDP Tx mode at CMs 112 . . . 114 via DOCSIS protocol 118. The idea of using OUDP bursts for detection leakage in high split network is illustrated in FIG. 2. The OUDP bursts 201 are generated by CMs in a cycle one by one according to the CMTS 117 scheduler. As an example, an OUDP burst 202 for 4 $k$ FFT mode with pilot pattern 11 and one frame including 4 minislots is shown in FIG. 2.

Figure 3:
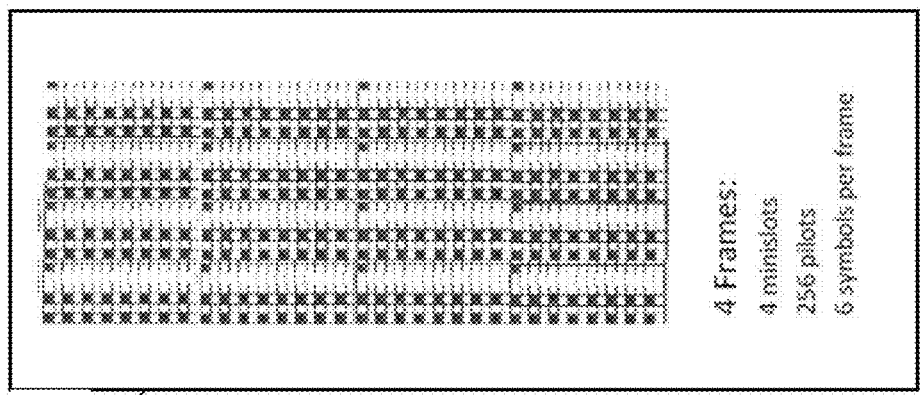
FIG. 3 is a drawing which illustrates OUDP burst structures for detection leakage in the case of $2k$ and $4k$ FFT modes.
Figure 3:
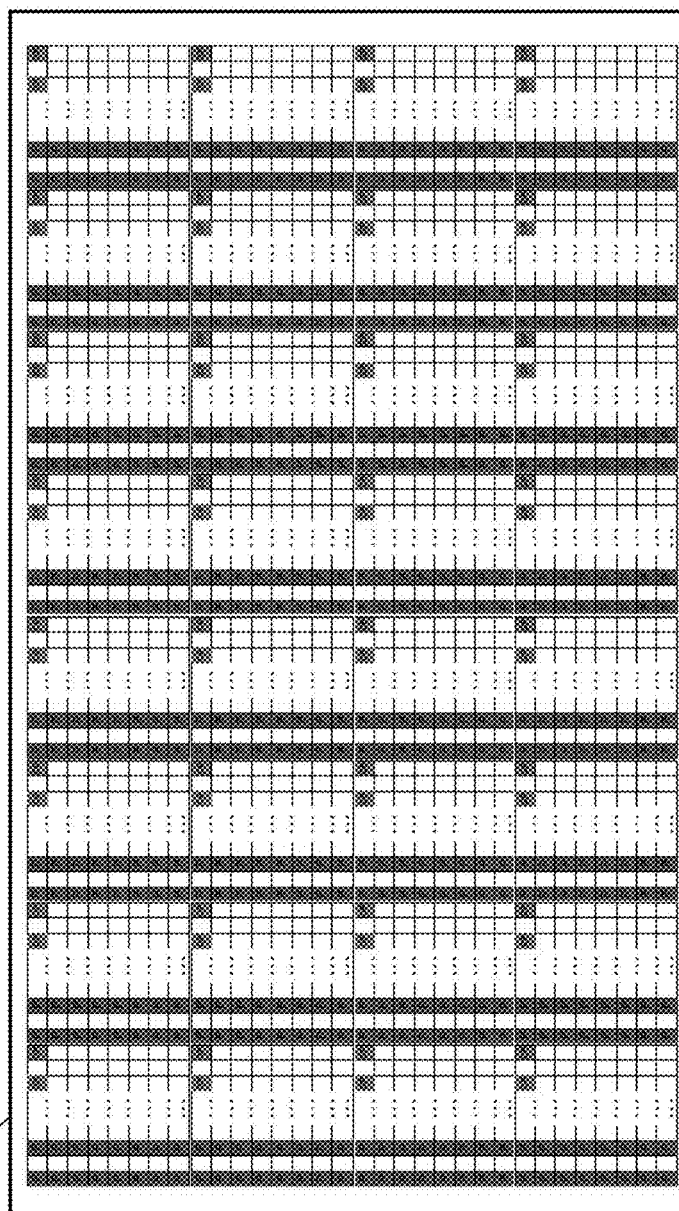

The detection of an OUDP leak signal is made possible by the matched filtering of the pilot pattern. From this point of view of leak detection, the selected OUDP burst should be one containing the maximum number (maximum energy) of pilots. From the other side, the duration of each OUDP burst should be limited within one or a few milliseconds to provide at least two Tx OUDP bursts from each CMs in a node during the one second measuring session. Based on analysis of required sensitivity of leakage detection the aeronautical band, the optimal tradeoff structures of OUDP bursts for 2 $k$ and 4 $k$ FFT modes are shown in FIG. 3.

In the case of 2 $k$ FFT mode the tradeoff OUDP structure 301 has the following parameters: Pilot pattern 4; 4 minislots; 8 frames; 6 symbols per frame; cyclic prefix 2.5 micro seconds. For the above parameters, the bandwidth of the OUDP burst will be 1.6 MHz and duration T will be 1.08 ms: T=(0.02 ms+0.0025 ms)×6×8=1.08 ms. In case of 4 $k$ FFT mode the tradeoff OUDP structure 302 has the following parameters: Pilot pattern 11; 4 minislots; 4 frames; 6 symbols per frame; cyclic prefix 5 micro seconds.

Because the duration of 4$k$ FFT symbol is two time more that for 2$k$ FFT mode, the 4 $k$ FFT mode can provide the same sensitivity where the number of frames is reduced by two times to 4 frames. However, the occupied bandwidth and duration T for 4 $k$ FFT mode are the same—1.6 MHz and 1.08 ms: T=(0.04 ms+0.005 ms)×6×8=1.08 ms. The estimated sensitivity of leak detection for above OUDP signals is around 1 micro Volt per meter.

The two new time stamp methods according to the Application depend on the type of high split HFC networks and operator preference. The first method can be used for the scenario of a high split HFC based of RPD when PTP is required as MUST and CMTS can provide GPS time sync of OUDP bursts. The second method can be used for the scenario of a high split HFC based on i-CMTS and MAC-PHY where PTP is not required and typically not used.

In the first method of time stamp method, synchronous scheduling is done by the CMTS by generating an OUDP burst sequence with GPS half second sync pulses. This scheduler is illustrated at time diagram in FIG. 4. The OUDP burst sequences 402 follows synchronously with GPS half second pulses 404. Between OUDP burst sequences, the CMTS can schedule data transmission frames 403 for more effective use of the Tx bandwidth 401. The structure of the OUDP sequence is illustrated by time plot 407. This OUDP sequence 407 includes M OUDP bursts with duration T (408). For an optimal T=1.08 ms, the maximum number of OUDP bursts M within half second will be about M=Round (500/1.08)=476. It should be enough to guarantee Tx of an OUDP burst for each CM in the node because the goal of migration to high split HFC is to provide no more than typically 256 CM in node. The ideal time synchronization of OUDP sequences 402 with GPS sync pulses 404 is less feasible, because the CMTS can provide the OUDP scheduler with frame grid in time domain only, but this time grid in the most common cases is not matched with the half second time grid. For example, for 4$k$ FFT OUDP burst with duration 1.08 ms the frame duration will be 1.08/4=0.27 ms. So, if the first OUDP sequence will be ideally synchronized with GPS sync pulse (see point 406 in FIG. 4), then after 1.5 seconds, the time offset 405 of frame time grid from GPS half sync pulse will be equals to:

$$\Delta T=0.27\ \text{ms}\times[1{,}500/0.27-\text{Min\_round}\ (1{,}500/0.27)]=\\ 0.27\times(5{,}555.555\ldots-5{,}555)=0.1499\ldots\ \text{ms}$$

So if the CMTS can provide the scheduler with a step one frame, the time offset 405 between GPS sync pulses and OUDP sequence will be changed each time within one frame. However in the most common cases, the time offset 405 could be more than one frame depending on the number of frames in OFDMA data transmission bursts 403. Thus, in these most common cases, it makes sense to assume some random time offset 405 compared to the duration of the OUDP burst. This time sync inaccuracy should be taken in account for implementation of the time stamp method.

Because the CMTS schedules OUDP bursts synchronous with GPS time sync pulses, measuring the time stamp of detected OUDP leak signal potentially allows to identify CM's ID in Tx sequence and then by polling data from database 108 (FIG. 1) to define CM physical address. The leakage detector should measure the time stamp of the detected OUDP signals. The block diagram of such leakage detector is presented in FIG. 5.

Figure 5:
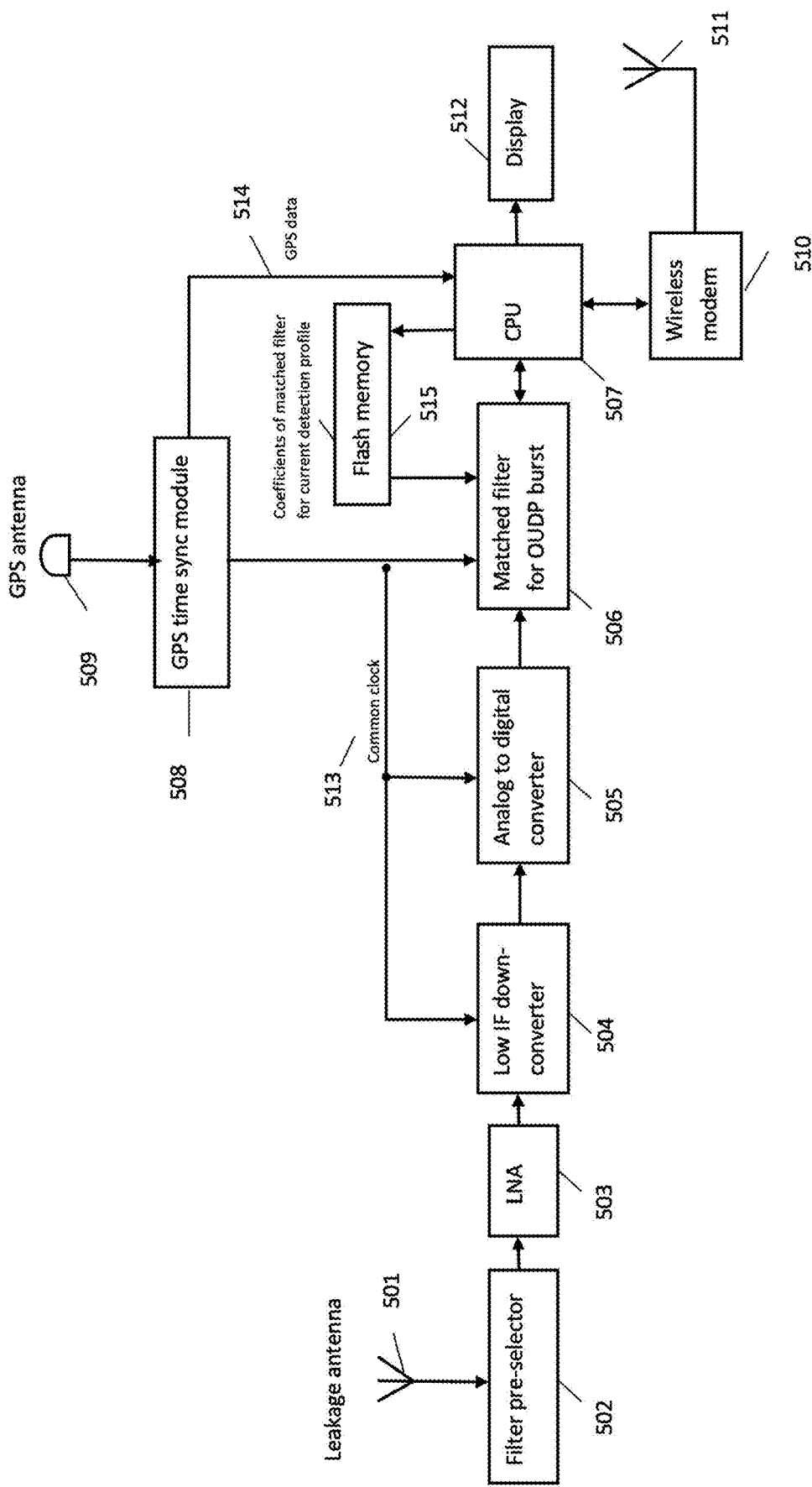
FIG. 5 is a block diagram of an exemplary leakage detector for detection of OUDP bursts and measuring OUDP time stamps.

The detector of FIG. 5 includes: leak antenna 501, band pass filter pre-selector 502 for rejection out of Rx bandwidth interfering signals, low noise amplifier (LNA) 503, low IF down converter 504, analog-to digital converter (ADC) 505, OUDP matched filter 506 connected to Flash memory 515 storing coefficients of matched filter, CPU 507 with display 512, GPS time sync module 508 with antenna 509 and wireless modem 510 with antenna 511. GPS module 508 generates common clock signal 10 MHz and PPS pulses. The clock signal 513 is used at down-converter 504, ADC 505 and matched filter 506, for matched filtering of the detected OUDP bursts. Also, GPS module provides GPS data 514 (UTC time stamp and GPS coordinates) for the CPU. The GPS data are used by CPU for preparing reports to leakage data server.

Figure 4:
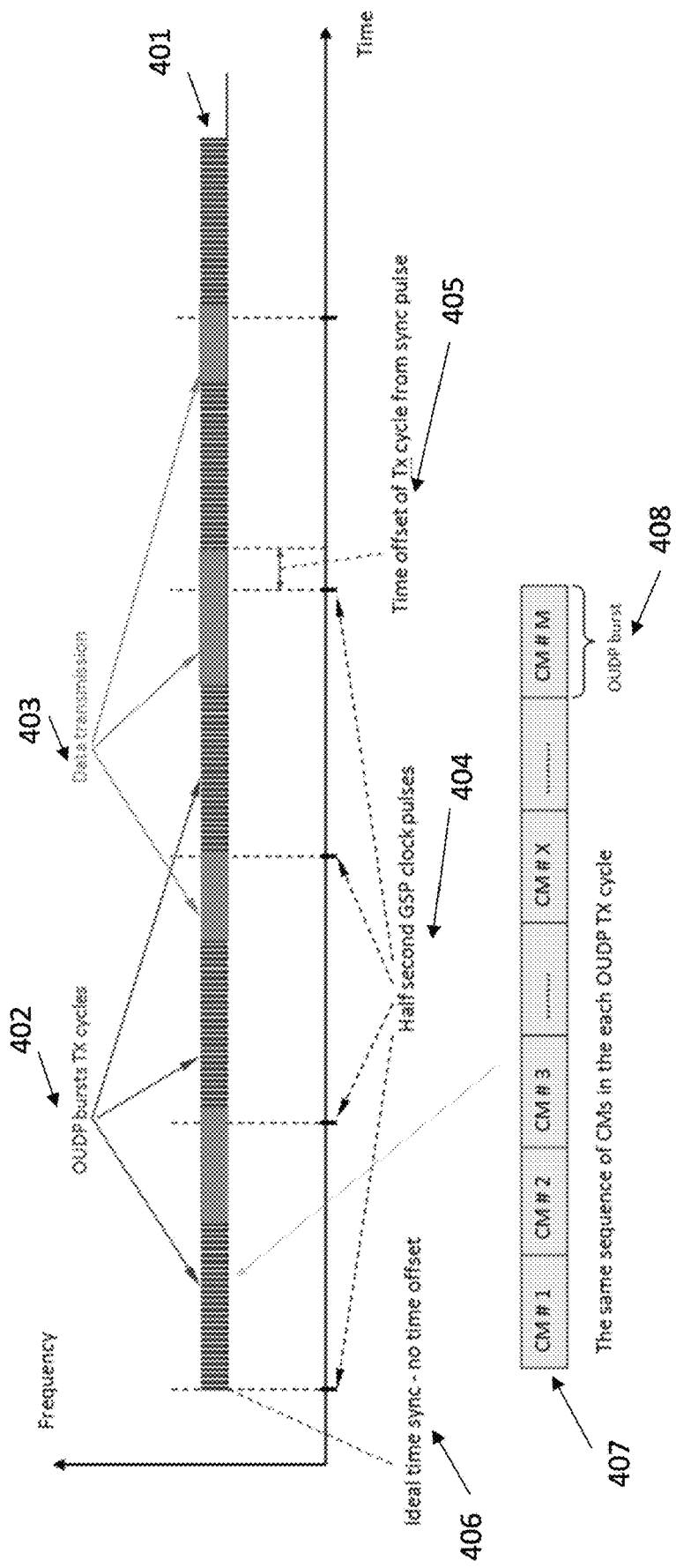
FIG. 4 is a time diagram of CMTS scheduler of sequence of OUDP bursts synchronous with GPS half second sync pulses.

The matched filter 506 can be implemented, for example, in an FPGA. This filter is working with the common GPS sync clock 10 MHz and receives PPS sync pulses from GPS module 508. The matched filter 506 can measure time stamp of detected OUDP bursts relative GPS PPS and PPS+0.5 sec i.e. relative half second sync pulses as at CMTS OUDP scheduler (FIG. 4).

Figure 6:
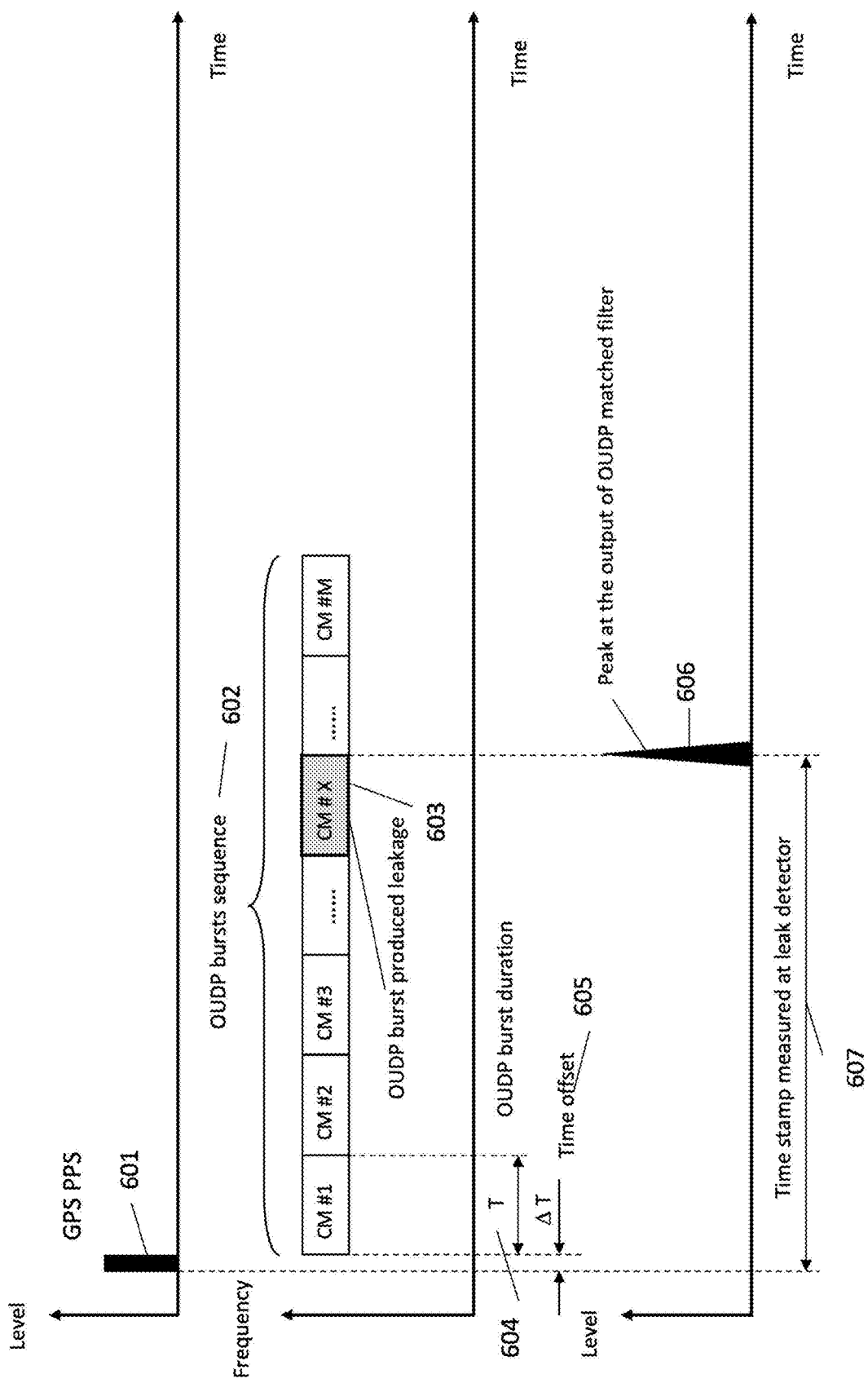
FIG. 6 is time diagram illustrated detection OUDP burst and measuring OUDP time stamp in leakage detector.

The time diagram of measuring time stamp T in the leakage detector of FIG. 5 is shown in FIG. 6. The OUDP sequence 602 includes M OUDP bursts with duration T-604. The first OUDP burst (CM #1) in sequence 602 has time offset A T-605 relative GPS PPS-601. The detected OUDP burst in sequence 602 is shown as burst CM #X-603. The peak 606 is the peak of correlation function at the output of matched filter 506 (FIG. 5). This peak 606 has time stamp 607 which is measured at leakage detector of FIG. 5. Time stamp 607 equals to TS=ΔT+X*T. The leakage detector in FIG. 5 sends this time stamps to leakage data server 107, where CM ID X is estimated by using formula: X (estimated)=Round (TS/T).

As discussed hereinabove, if the CMTS can provide a scheduling of the OUDP burst within one frame, and if the OUDP burst includes 8 or 4 frames (FIG. 3), then an estimation X by use of the above formula will be very accurate because time offset ΔT will be less than 25% of OUDP burst duration T and rounding to integer will calculate correct the X number. However, if the CMTS schedules the OUDP burst with a time grid of a duration of the OUDP burst, then the estimated number X could be equal as to X−1 and to X+1 too. In other words, the CM ID could be defined with a mistake of +/−1. To overcome this inaccuracy, the generation order of the CMs in the OUDP sequence can be scheduled by the CMTS to provide at the leakage data server 107 (FIG. 1) by use of spatial interleaving of the CMs in the sequence.

Figure 7:
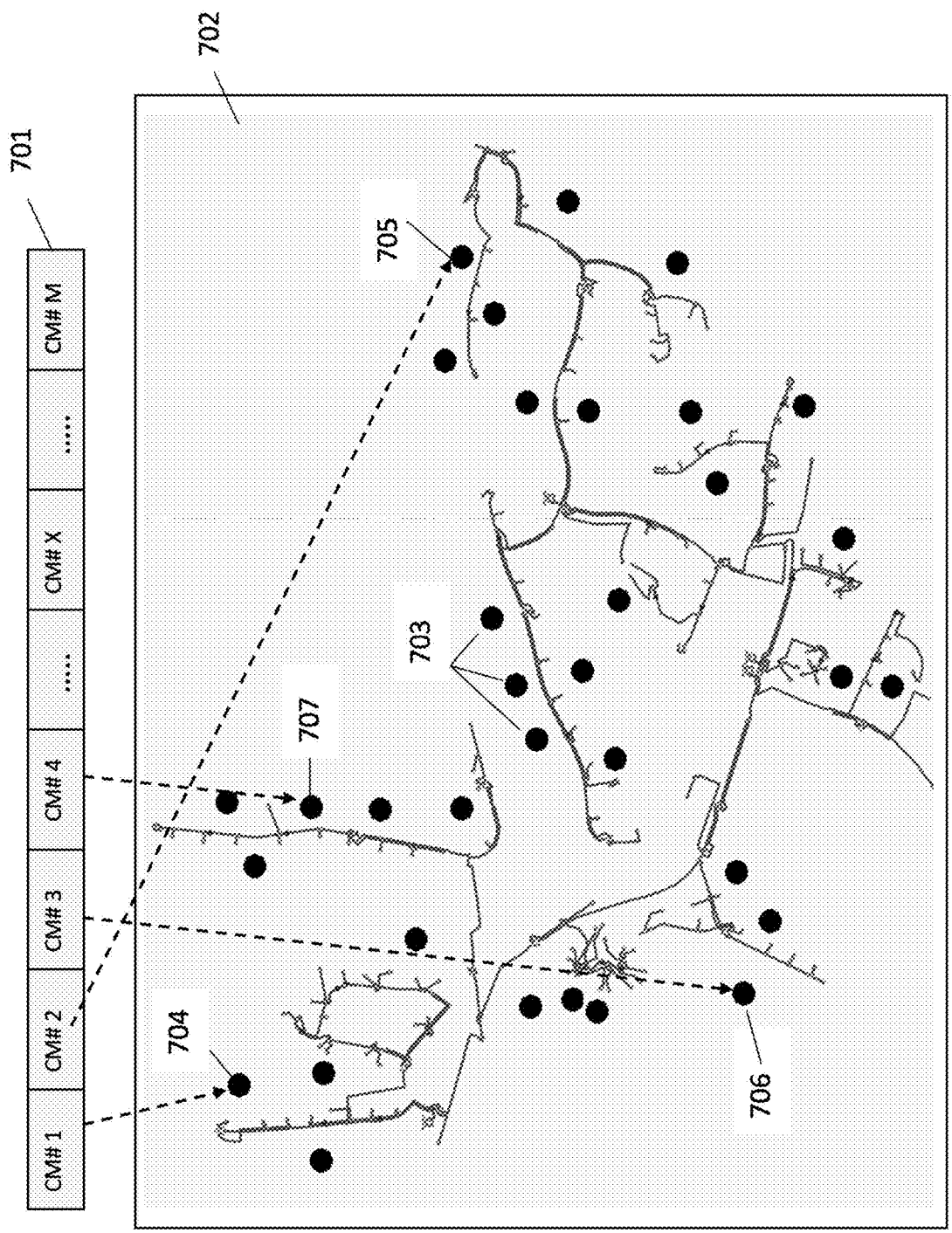
FIG. 7 is a map showing an exemplary spatial interleaving of CMs in an OUDP burst sequence as scheduled by a CMTS.

The idea of special interleaving of CMs is illustrated in FIG. 7. The sequence of CMs 701 in node 702 is formed such way that adjacent CMs 704, 705, 706,706 in sequence 701 are located at a maximum distance from each other. In this case, the leakage data server after calculation estimated CM ID #X additionally, selects adjacent CMs with IDs #X−1 and #X+1 (or more if necessary) and provides an analysis as. to how far above CMs were located from leak detector in moment of measuring time stamp T. Now, the CM which was located close to leak detector is highly likely to be the correct leakage source.

Figure 8:
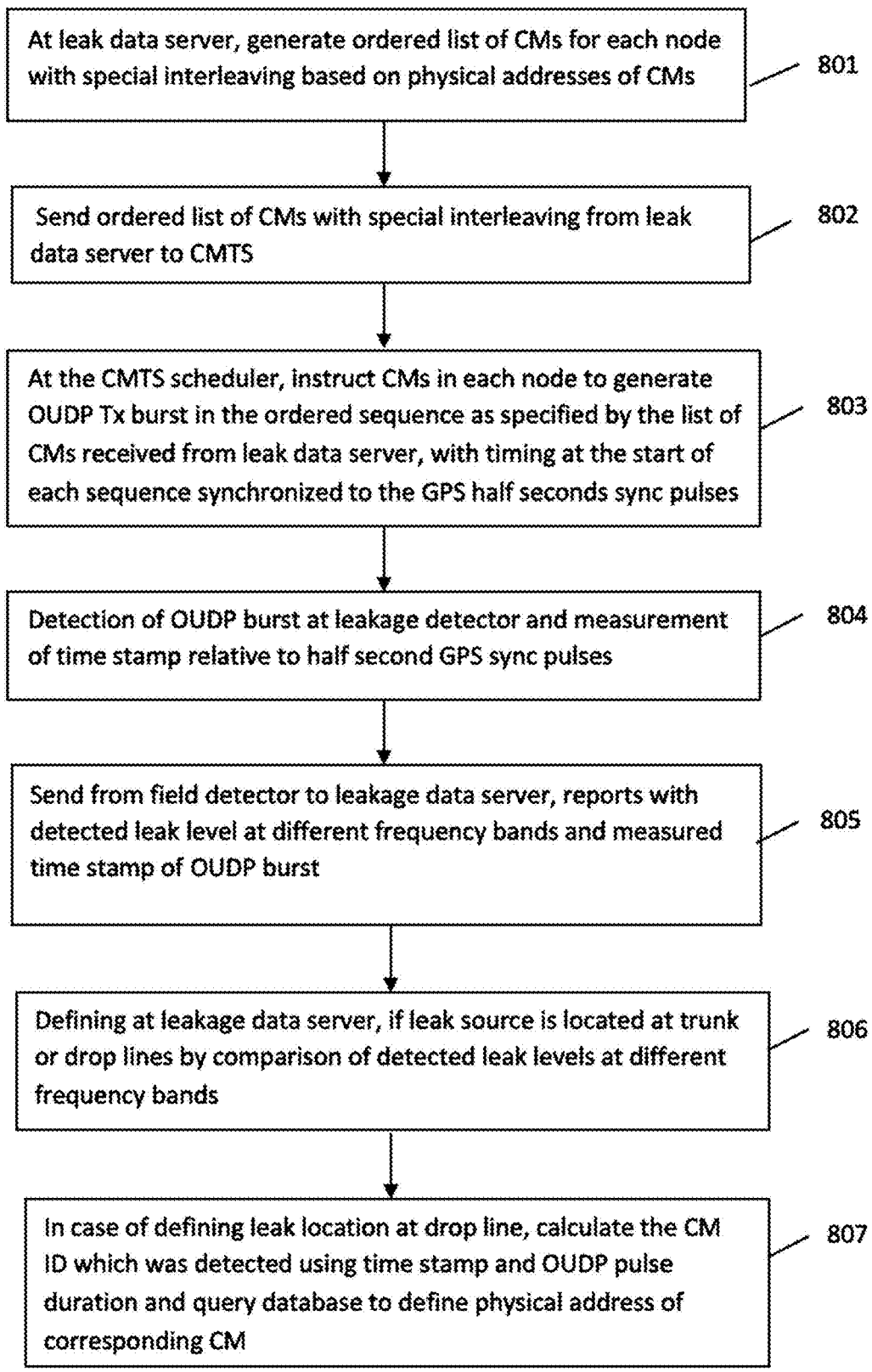
FIG. 8 is a flow diagram showing an exemplary time stamp method to locate leakage in a high split HFC network for a scenario of GPS synchronization OUDP bursts.

FIG. 8 shows an exemplary flow diagram outlining an algorithm of the time stamp method of location leakage in high split HFC network according to the Application.

At the first step 801 the leakage data server generates a list of CMs with spatial interleaving for each node and sends this list to CMTS at next step 802. Then at step 803, the CMTS instructs CMs in each node to generate OUDP Tx burst in the ordered sequence as specified by the list of CMs received from leak data server, with timing at the start of each sequence synchronized to the GPS half seconds sync pulses. At the next step 804, the field leakage detector provides a detection of the OUDP leakage signal and measures the time stamp relative to the GPS half seconds sync pulses. Then at step 805, the leakage detector sends a report to the leakage data server. This report also can include results of detection of downstream leakage at higher frequency bands, typically in Mid band 350-650 MHz and/or in the LTE band 650-800 MHz. The leakage data server at next step 806 provides a comparative analysis of detected leak levels in the different bands and if leak level at aeronautical band (upstream OUDP leak) which is generally much higher than the leak level detected at Mid and LTE bands (downstream leak) and if the measured OUDP time stamp is stable within adjacent reports, then the server makes a decision that the leak comes from a drop line. At last step 807, the leakage data server estimates CM ID X and adjacent IDs X−1 and X+1, polls physical addresses of above CMs from database and provides spatial analysis as to which CM is closer to the leak detector location at the moment of sending report. That CM is then identified as leakage signal source.

Some networks might use a current time other than GPS time, such as for example, DOCSIS time. In such cases, one solution would be to record a delta time between the system time and GPS time. For example, if a 200 ms time difference is noted between the local network system and GPS time, then successive processes according to the Application can proceed as described hereinabove using GPS time with the now known time offset (200 ms in the example). Also, any suitable time reference can be used in place of GPS, including GLONASS, etc.

Figure 9:
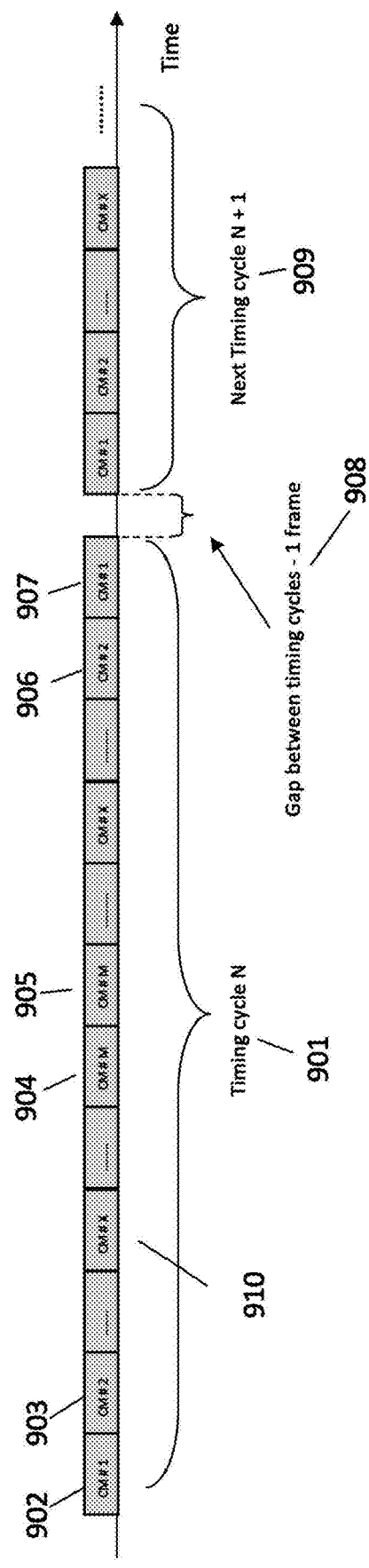
FIG. 9 is a time diagram of a CMTS scheduler of an exemplary OUDP burst sequence for a differential time stamp method.

The Differential Time Stamp method is another version of the method to remotely determine the CM ID of the detected leak. With the Differential Time Stamp method, the timing sequence of the OUDP bursts by CM is altered as shown in FIG. 9. In this case, the timing cycle N 901 includes CM1 902, CM2 903 through the entire sequence of CM M 904. Then to complete the sequence the CMs, each generate a second OUDP burst, but in a reverse order, with CM M 905 bursting followed in reverse order through CM 2 906, and lastly to complete the cycle CM 1 907. Prior to the next complete timing cycle 909, a gap between timing cycles of one frame 908 can be added.

Figure 10:
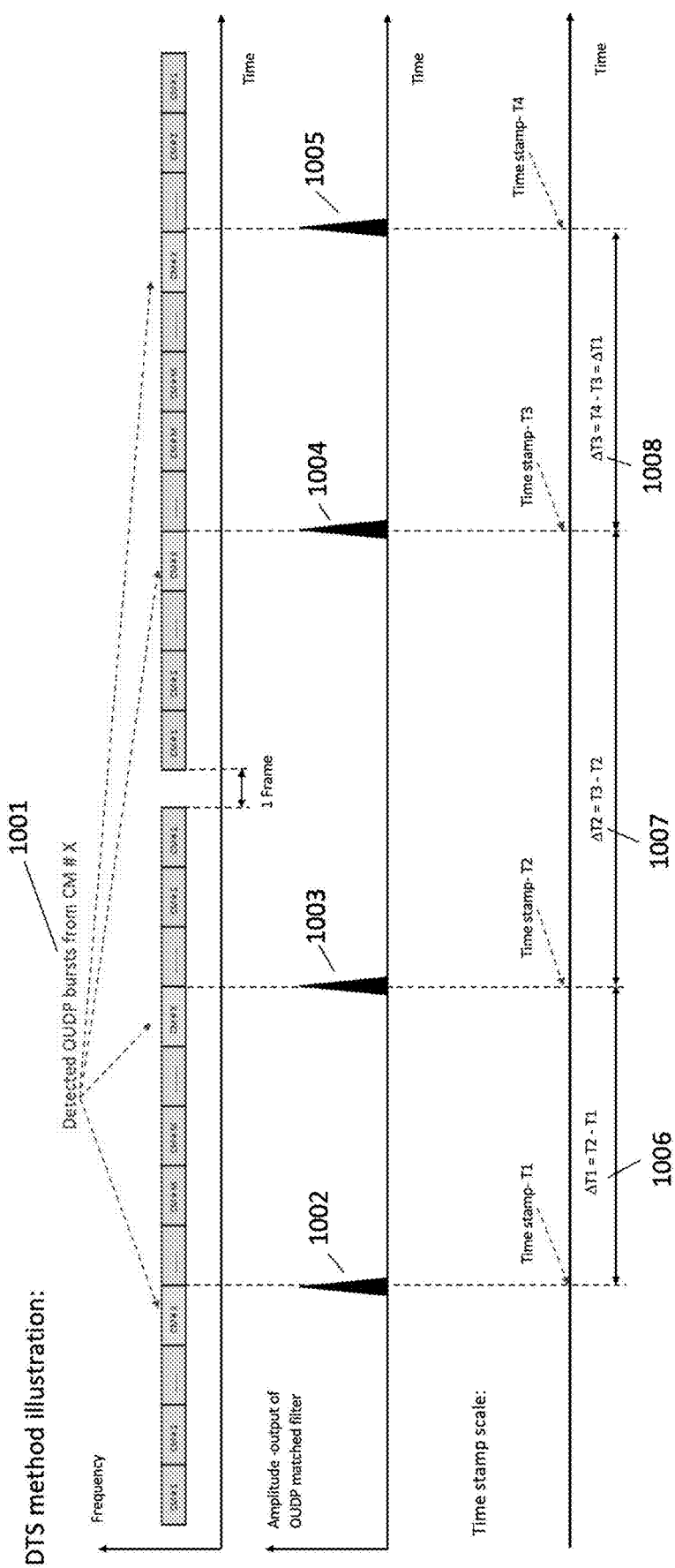
FIG. 10 is a time diagram which illustrates the detection of OUDP bursts and measuring time difference between OUDP bursts of a leak signal.

FIG. 10 describes the Differential Time Stamp method of the measurement sequence taking place at leakage detector 103. While stationary, leakage detector 103 measures signal leakage from multiple CM OUDP bursts. In this example we will assume the detected burst originated from CM #X 1001. The first burst generated by CM #X detected by leakage detector 103 occurs at a time corresponding to a recoded time stamp T1 1002. The second time stamp at T2 1003, a third time stamp at T3 1004, and a fourth time stamp at T4 1005.

Time differences between the time stamps are calculated. ΔT1=T2−T1 (1006), ΔT2=T3−T2 (1007), ΔT3=T4−T3 (1008). Note that because of the sequence of the timing cycle N 901, that ΔT3 (1008) is equal to ΔT1 (1006).

DTS Method

ΔT1 (frames)=ΔT3=T2−T1=(2M−2X+1)×F; ΔT2 (frames)=T3−T2=(2X−1)×F+1 frame, where F is a number of frames in OUDP burst. It's always even value: F=4 or 8. M is the last cable modem in the burst sequence (904) X is the CM ID X (1001).

As follows from the above relations, the time difference ΔT1 is always includes even number of frames (because F is even value), while ΔT2 always includes odd number of frames.

Thus, if the measured time difference ΔT between adjacent measured time stamps includes even number of frames, then for calculation, CM ID must be used relation for ΔT1 and formula for calculation will be as follows:

$$X=M-\Delta T(\text{frames})/F+\tfrac{1}{2} \quad (1)$$

where M is a number of active CMs in node. Note, if value M is unknown priory, than it could be calculated as follows: M=[ΔT1 (frames)+ΔT2 (frames)]/2 F.

If measured ΔT between adjacent measured time stamps includes odd number of frames, than for calculation CM ID must be used relation for ΔT2 and formula for calculation will be as follows:

$$X=[\Delta T(\text{frames})-1]/2F+\tfrac{1}{2} \quad (2)$$

The formula of equation 2, does not include M. That means that equation 2 is invariant for number of active CMs in node.

Figure 11:
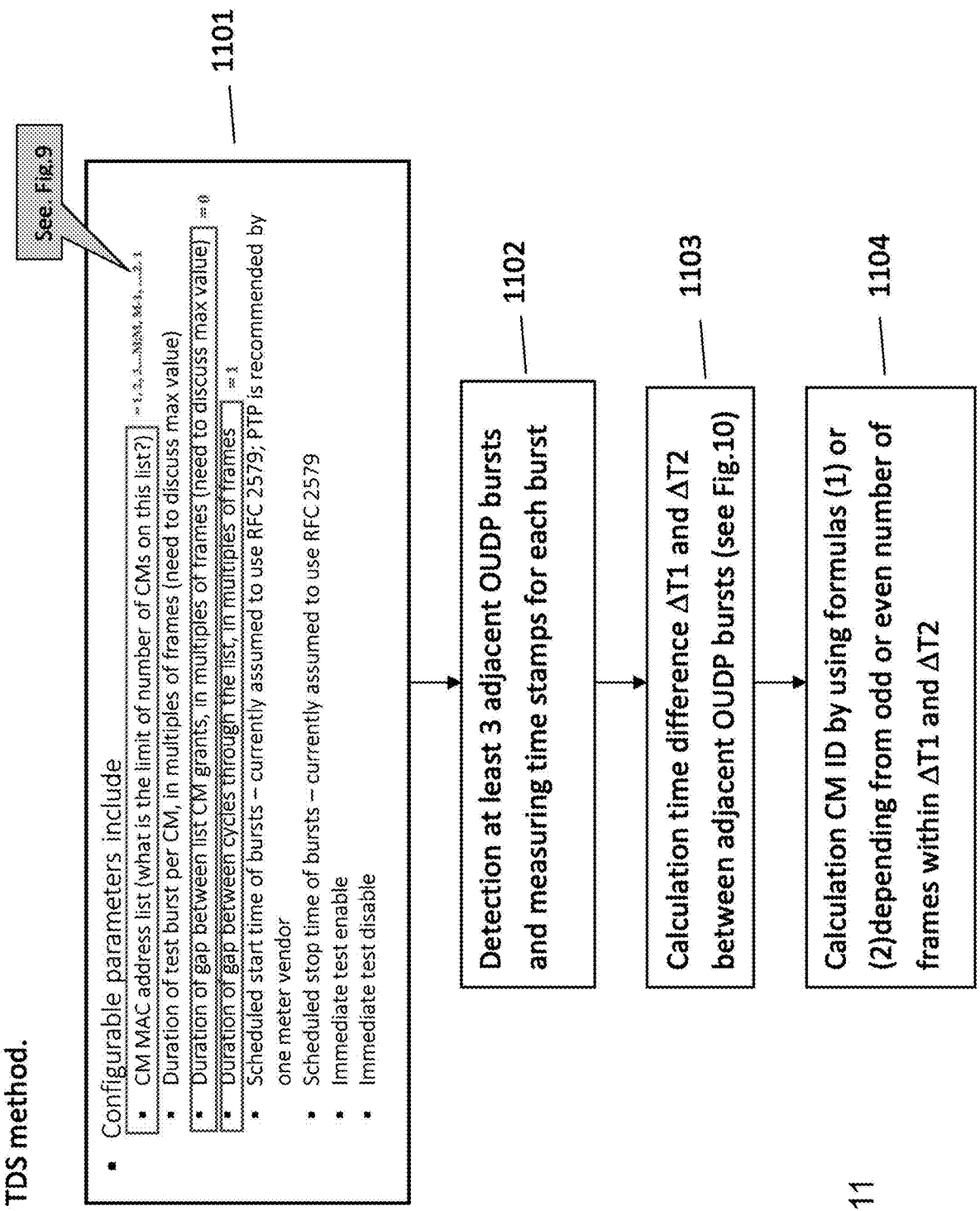
FIG. 11 is a flow diagram showing a process algorithm of a differential time stamp method of location leakage in high split HFC network according to the Application.

FIG. 11 provides a flow chart of the Differential Time Stamp Method. Box 1001 generally speaks to the configuration of the OUDP burst, and importantly contains information as to the number of CM's and the structure of timing cycle N 901, ensuring that the proper sequence is scheduled. Box 1002 specifies the minimum requirements of the number of adjacent OUDP bursts, and measurement of the time stamps of each burst. Box 1003 illustrates calculating the differential ΔT between each of the detected bursts. Box 1004 illustrates the process of mathematically calculating the CM ID as described in the formulas hereinabove.

A server, such as for example, a leakage data server (e.g. leakage data server 107), is understood to typically include a computer having a processor and any suitable type of associated memory (e.g. including CMs database 1008). A leakage receiver, such as, for example, the leakage receiver of FIG. 5, is understood to include at least one processor (e.g. CPU 507) and any suitable memory (e.g. flash memory 515).

A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A time stamp method of location leakage in an aeronautical band of a high split hybrid-fiber-coaxial (HFC) comprising:
    scheduling at a cable modem termination system (CMTS), a generation of a plurality of orthogonal frequency division multiple access (OFDMA) upstream data profile (OUDP) bursts by at least one cable modem (CM) within a node in a fixed sequence, a first OUDP burst in said generation of OUDP bursts synchronous with a global positioning satellite (GPS) half second sync pulse;
    measuring a field leakage detector time stamp of a plurality of detected OUDP bursts relative to the GPS half second synch pulse, and sending a report to a leakage data server with a set of current GPS coordinates of a leakage detector, said field leakage detector time stamp, a detected leak level, and a measured OUDP time stamp; and
    calculating at said leakage data server, a CM ID based on said measured OUDP time stamp and a duration of said first OUDP burst combined with a first query to said CMTS and a second query to a CM database, to define a physical address of a CM corresponding to said CM ID,
    wherein said step of calculating comprises calculating a routing to an integer value of a CM ID=X, based on said measured OUDP time stamp and said OUDP burst duration, and a spatial analysis of adjacent CMs in a sequence with IDs=X−1, X and X+1, and then selecting said CM ID which is located closer to a leakage detector location at about said measured OUDP time stamp.

2. The time stamp method of location leakage of claim 1, wherein said step of scheduling comprises said generation of said plurality of OUDP bursts with a spatial interleaving where adjacent OUDP bursts in said sequence corresponds to CMs located in a node area.

3. The time stamp method of location leakage of claim 1, wherein said step of scheduling comprises generating said sequence of OUDP bursts synchronous with GPS half second sync pulses wherein a sync accuracy is selected within an integer number of OFDMA frames.

4. The time stamp method of location leakage of claim 1, wherein said step of calculating comprises determining if a leakage comes from a drop or trunk line by comparing a level of a detected upstream OUDP leakage with a downstream leakage level detected at higher frequencies bands, and stable time stamp of a detected OUDP burst within an adjacent one second measurement session.

5. A time stamp method of location leakage in an aeronautical band of a high split hybrid-fiber-coaxial (HFC) comprising:
    scheduling at a cable modem termination system (CMTS), generation of a plurality of orthogonal frequency division multiple access (OFDMA) upstream data profile (OUDP) bursts by a plurality of cable modems (CM) within a node, a fixed sequence from a first CM #=1 to a last CM #=M, and then from said last CM #=M to said first CM #=1;
    measuring at a leakage detector, a time difference between a plurality of time stamps of detected adjacent OUDP bursts, and sending at least one report to a leakage data server with a set of current global positioning satellite (GPS) coordinates of said leakage detector, said measured time difference between said plurality of time stamps of said detected adjacent OUDP bursts, and a detected leak level; and
    calculating at said leakage data server, a CM ID sequence scheduled by said CMTS based on said measured time difference between said detected adjacent OUDP bursts and a query that is sent to a CM database to define a physical address corresponding to said CM ID sequence,
    wherein said step of calculating comprises defining said physical address based on a number of OFDMA frames within a measured time difference interval between said detected adjacent OUDP bursts, followed by calculating a CM order in a transmission (Tx) sequence based on a number of odd or even frames within said measured time difference between said detected adjacent OUDP bursts.

6. The time stamp method of location leakage in the aeronautical band of claim 5, wherein said step of scheduling comprises generating said OUDP bursts where each OUDP burst includes an even number of OFDMA frames and where a gap between sequences of said OUDP bursts is defined by one OFDMA frame.

7. A time stamp method of location leakage in an aeronautical band of a high split hybrid-fiber-coaxial (HFC) comprising:
    scheduling at a cable modem termination system (CMTS), a generation of a plurality of orthogonal frequency division multiple access (OFDMA) upstream data profile (OUDP) bursts by at least one cable modem (CM) within a node in a fixed sequence, a first OUDP burst in said generation of OUDP bursts synchronous with a global positioning satellite (GPS) half second sync pulse;
    measuring a field leakage detector time stamp of a plurality of detected OUDP bursts relative to the GPS half second synch pulse, and sending a report to a leakage data server with a set of current GPS coordinates of a leakage detector, said field leakage detector time stamp, a detected leak level, and a measured OUDP time stamp; and
    calculating at said leakage data server, a CM ID based on said measured OUDP time stamp and a duration of said first OUDP burst combined with a first query to said CMTS and a second query to a CM database, to define a physical address of a CM corresponding to said CM ID, wherein said step of calculating comprises calculating a routing to an integer value of a CM ID=X, based on said measured OUDP time stamp and said OUDP burst duration, and a spatial analysis of adjacent CMs in a sequence with IDs=X−1, X and X+1, and then selecting said CM ID which is located closer to a leakage detector location at about said measured OUDP time stamp, wherein said OUDP time stamp for said CM ID=X−1 is T1, said CM ID=X is T2 and CM ID=X+1 is T3, and, wherein said OUDP burst duration of $\Delta T1=T2-T1$, of $\Delta T2=T3-T2$, and of $\Delta T3=T4-T3$, such that when there are an even number of OUDP bursts then the calculation utilizes the formula $X=M-\Delta T \text{ frames}/F+\frac{1}{2}$, where M is a number of active CMs in a node and F is the number of frames, and such that when there are an odd number of OUDP bursts then the calculation utilizes the formula $X=(\Delta T \text{ frames}-1)/2F+\frac{1}{2}$.

\* \* \* \* \*